No. 649,955. Patented May 22, 1900.
J. RONK.
COMBINED SAW SETTING, GUMMING, AND WIRE WORKING TOOL.
(Application filed Mar. 9, 1899.)
(No Model.)
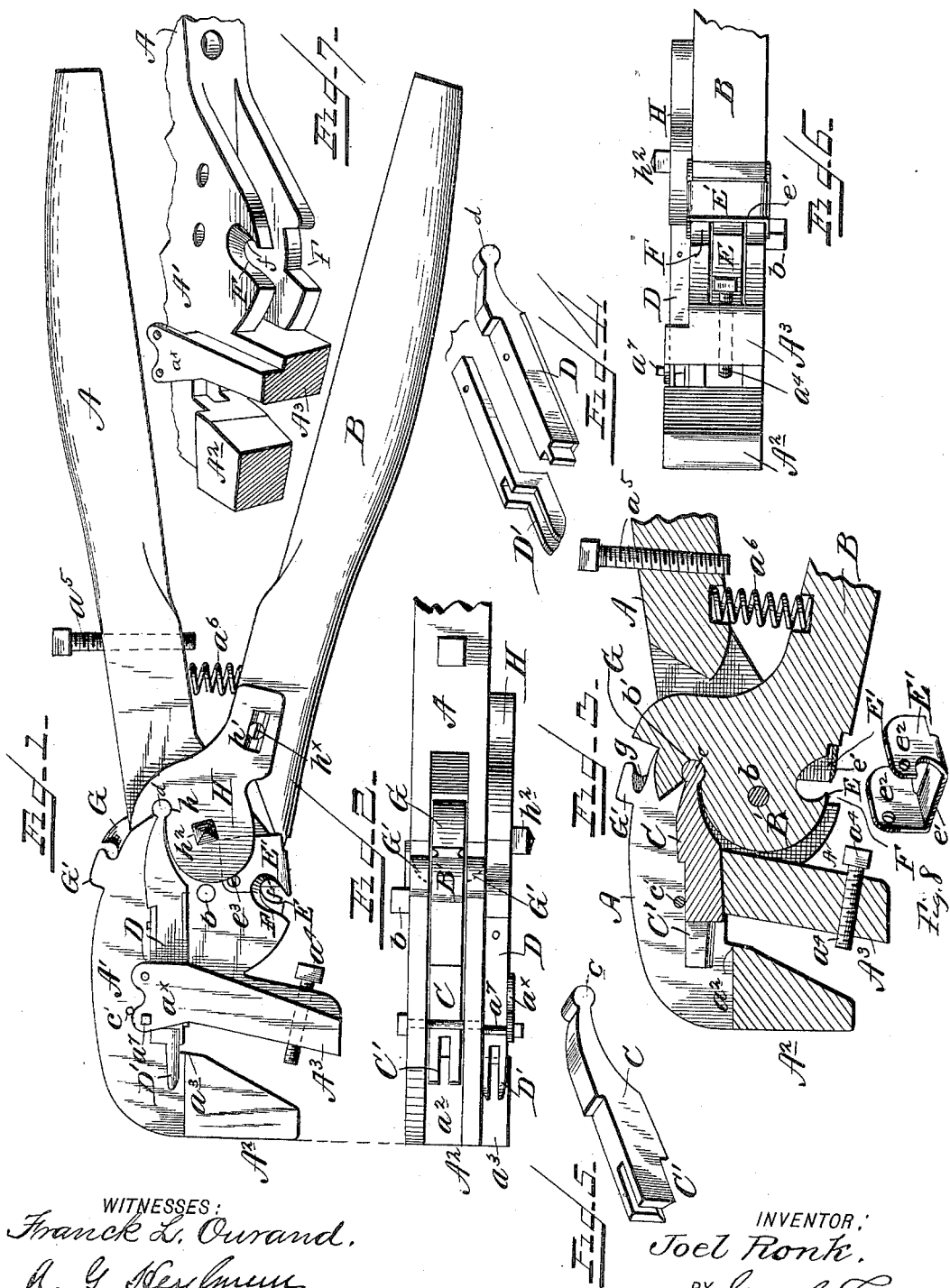
WITNESSES:
Franck L. Ourand.
A. G. Heyfmun
INVENTOR:
Joel Ronk.
BY Geo. H. Evans
ATTORNEY.

UNITED STATES PATENT OFFICE.

JOEL RONK, OF BIDDLE, OHIO.

COMBINED SAW SETTING, GUMMING, AND WIREWORKING TOOL.

SPECIFICATION forming part of Letters Patent No. 649,955, dated May 22, 1900.

Application filed March 9, 1899. Serial No. 708,354. (No model.)

*To all whom it may concern:*

Be it known that I, JOEL RONK, a citizen of the United States of America, residing at Biddle, in the county of Crawford, in the State of Ohio, have invented certain new and useful Improvements in a Combined Saw Setting, Gumming, and Wireworking Tool, of which the following is a specification.

The objects of my invention are to provide a hand-tool with saw-sets adapted to set different-sized teeth, to provide the setting-tools with slotted or forked gages to receive the saw-teeth to be set, to provide the two members of the tool with jaws for gumming the saw-teeth and cutting wire, and with other jaws for bending wire. These objects I accomplish by the mechanism shown in the accompanying drawings, in which—

Figure 1 is a side elevation of my improved saw setting, gumming, and wireworking tool. Fig. 2 is a plan of the front end thereof. Fig. 3 is a sectional side elevation to show the inner saw-setting tool. Figs. 4 and 5 are perspectives of the setting-tools. Fig. 6 is a bottom plan of Fig. 2. Fig. 7 is a fragmentary perspective of the head A'. Fig. 8 is a perspective of the transverse blade with which the blade or tooth E coacts to form the saw-gummer.

A B designate the two hand-levers, the former having a slotted or bifurcated head A' at its outer end, within which the head B' at the forward end of lever B is pivoted on the pivot bolt or pin $b$. The outer end of the head A' is transversely slotted to form the saw-receiving jaws A$^2$ A$^3$, the upper portion of the jaw A$^2$ being provided with anvils $a^2$ $a^3$, across which the sliding setting tools or punches C D work in the same direction, as will be more fully described.

The jaw A$^3$ is provided with a set-screw $a^4$, adjustable toward and from the jaw A$^2$ to regulate the position of the saw being operated upon, while the lever A is provided with a similar set-screw $a^5$, which limits the inward movement of the levers. The levers or handles are forced apart by the usual spiral spring $a^6$ in rear of their pivotal point.

The head B' is provided in its upper forward portion with a socket $b'$, in which the circular tenon $c$ on the rear end of the setting tool or punch C is seated, so that when the levers are forced together the tool or punch C will be forced to bend or set the saw-tooth at the anvil $a^2$. This tool or punch slides under a removable pin $c'$, which holds it down to its work. The forward end of the punch or setting tool C is provided with a slotted or forked extension or gage C', which overhangs its setting portion and receives the saw-tooth to be operated upon. Thus the tooth will always be held in proper position for the tool or punch to act upon.

The outer sliding setting tool or punch D is for operating on smaller saw-teeth and is on a lower plane than the tool C, which is for larger teeth. The tool or punch D is also provided with a forked or slotted extension or gage D', which may be integral with the punch or formed separately and secured to the upper side thereof. The tool D works through a suitable guide $a^\times$ on the jaw A$^3$ and under a removable pin $a^7$. The rear end of the tool or punch D is provided with a circular tenon $d$, which enters a correspondingly-formed socket $h$ in the upper forward edge of a lever H, removably pivoted at $h^2$ below said socket to the head A' in rear of the pivot $b$, the lever H being further provided with a rearward extension having a slot $h'$, through which a pin $h^\times$ on lever B passes. Thus when the levers A B are forced together the lever H will be rocked, and its upper end will force the tool D forwardly. By removing the pin $a^7$ the punch D may be raised from its guide $a^\times$, and its rear end moved laterally out of the socket $h$ for sharpening.

The lower edge of the head is provided with a recess F, adapted to receive the toothed edge of a saw to be gummed or a wire to be cut. One rear edge of this recess F is formed as a cutting edge $f$. The lower edge of the head B' is provided with a saw-gumming and wire-cutting blade E, the side edge of which coacts with the cutting edge $f$ to cut wire, and the lower saw-gumming edge of this blade E works rearwardly past the forward sharpened edge $e'$ of a transverse cutter E', provided with attaching-ears $e^2$ $e^2$, detachably secured by screws $e^3$ $e^3$ to the outer sides of head A'. Thus the wire may be cut or a saw gummed in the usual manner, but at the same point and by the same blade E.

In order to bend wire into curves, rings, or eyes, I provide the top edges of the head A' with jaws G' G', the rear edges of which are concaved, as at g, and the top edge of the head B' is provided with a bending-finger G, the front edge of which is rounded, so that when a wire is passed between the jaws and finger and the levers A B are forced together the finger G will be moved forwardly and bend the wire into the concavities g instead of severing it. By moving the wire past the jaws G' and operating the finger G the wire may be bent into a complete ring or eye, if desired.

It will be seen that a compact and powerful tool is provided by my construction for the several purposes set forth and that the thrust on the setting-punches C D is in the direction of their length. Moreover, by reason of the circular tenons of the punches entering similar sockets in their operating-levers no retracting springs are necessary, as the said sockets and tenons serve to retract the punches and prevent accidental disconnection.

What I claim is—

1. A saw-setting tool comprising the lever having a sloted head provided at its front end with a saw-receiving recess, and the second lever having a head pivoted in the first-named head, and two setting punches or tools working across the upper end of said saw-receiving recess in different planes and operatively connected at their inner ends to the said second lever, substantially as described.

2. In a tool of the character described, a saw-setting punch provided at its working end with a forwardly-projecting slotted tooth-engaging extension or gage, substantially as described.

3. A saw-setting tool comprising the pivoted hand-levers having heads at their front ends; a saw-setting punch working across the saw-receiving recess in the outer jaw and operatively connected with the inner head, a second setting-punch on the outer side of the outer jaw and also working across said recess, and a lever pivoted between its ends to the outer head and engaging at its upper end the rear end of said punch and at its lower rearwardly-extending end operatively connected to the lever of the inner head, substantially as described.

4. A saw-setting tool comprising the levers A, B, having heads A', B', pivoted together, the head A' having a saw-receiving recess at the forward end, and the head B' having a rounding socket in its forward upper portion, a setting-punch sliding in the head A', and having a rounding tenon at its rear end entered laterally in said socket, a second setting-punch sliding on the outer side of head A' and having a rounding tenon at its rear end, and a lever pivoted between its ends on the outer side of head A', and provided above its pivot with a rounding socket into which the tenon of the second punch is laterally inserted, and at its opposite end having a rearward extension provided with a slot receiving a pin on the handle B, substantially as described.

5. The combination with the lever A having a longitudinally-slotted head A', provided with a saw-receiving recess and setting-anvil and a transverse recess to receive a wire or the toothed edge of a saw, and having a cutting edge f, of the lever B, having a head B', pivoted within the head A', and provided with a saw-gumming and wire-cutting tooth or blade; the side edge of one wall of the said tooth or blade coacting with the edges f to cut wire, a cross-blade with which the lower edge of said gumming and cutting blade coacts to form a saw-gummer, and a setting-punch operatively connected to the head B', substantially as described.

6. A combined saw-set and wire-cutter comprising the lever A having a slotted head A', provided with a saw-receiving recess and setting-anvil, of the lever B, having a head B', pivoted in the head A'; the latter having wire-cutting jaws and wire-bending jaws, and the head A' being provided with a setting tool or punch, a bending-finger operating past the bending-jaws, and with a wire-cutting blade operating past the cutting-jaw of the head A', substantially as described.

7. A combined saw-setting and wireworking tool comprising, the lever A having a slotted head provided with a saw-receiving recess or jaw at its front end and with wire-receiving jaws in rear thereof, and a saw-setting punch mounted in the head and working across the said recess, of a lever B having a head B' pivoted in the head A', connected with the setting-punch to operate the same and provided with a notch or finger working past the said wire-receiving jaws, substantially as described.

8. A combined saw setting, gumming and wireworking tool comprising the lever A having a longitudinally-slotted head A' provided at its front end with a saw-receiving recess, and a saw-setting mechanism, bending-jaws G' on its upper edge and a saw and wire receiving recess F in its lower side; one wall of which forms a cutting edge f, and a transverse blade E' below the edge f, a second lever B having a head B' pivoted in the head A', operatively connected with its saw-setting mechanism, formed on its upper edge with a bending-finger and provided on its lower edge with a cutting tooth or blade E which operates in connection with the cutting edge f of head A' to cut wire, and with the blade E' to gum saw-teeth, substantially as described.

In testimony whereof I affix my signature in presence of two witnesses.

JOEL RONK.

Witnesses:
S. R. HARRIS,
JENNIE C. REXROTH.